United States Patent
He et al.

(10) Patent No.: US 12,513,384 B2
(45) Date of Patent: Dec. 30, 2025

(54) CAMERA MODULE, MANUFACTURING METHOD THEREOF, AND MANUFACTURING METHOD OF GLASS THEREFOR

(71) Applicant: TONG HSING ELECTRONIC INDUSTRIES, LTD., Taoyuan (TW)

(72) Inventors: Xie-Zhe He, Taipei (TW); Sin-Chun Li, Taipei (TW); Chia-Min Wu, Taoyuan (TW); Kuan-Hsun Wu, Taoyuan (TW)

(73) Assignee: TONG HSING ELECTRONIC INDUSTRIES, LTD., Taoyuan (TW)

( * ) Notice: Subject to any disclaimer, the term of this patent is extended or adjusted under 35 U.S.C. 154(b) by 79 days.

(21) Appl. No.: 18/772,234

(22) Filed: Jul. 14, 2024

(65) Prior Publication Data

US 2025/0227352 A1    Jul. 10, 2025

(30) Foreign Application Priority Data

Jan. 9, 2024   (TW) ................ 113100847

(51) Int. Cl.
*H04N 23/55*   (2023.01)
*G02B 7/00*    (2021.01)
(Continued)

(52) U.S. Cl.
CPC ............ *H04N 23/55* (2023.01); *G02B 7/006* (2013.01); *H04N 23/51* (2023.01); *H04N 23/57* (2023.01)

(58) Field of Classification Search
CPC ........ H04N 23/50; H04N 23/51; H04N 23/55; H04N 23/57; G02B 7/006
See application file for complete search history.

(56) References Cited

U.S. PATENT DOCUMENTS 6,590,269 B1 *  7/2003  Chuang ................... H10F 77/50
                                          257/E31.118
8,830,388 B2 *  9/2014  Kinoshita .............. H04N 23/57
                                          348/340

(Continued)

FOREIGN PATENT DOCUMENTS

JP           H11217232 A  *  8/1999

OTHER PUBLICATIONS

Machine Translation of JP-H11217232-A to Masayshi published Aug. 10, 1999.*

*Primary Examiner* — Daniel M Pasiewicz
(74) *Attorney, Agent, or Firm* — Li & Cai Intellectual Property Office (57) ABSTRACT

A camera module includes a camera lens and an alignment glass sheet. The camera lens includes a carrying frame, a sensor chip corresponding in position to the carrying frame, and at least one optical lens that is assembled to the carrying frame. The carrying frame has an alignment slot, and the at least one optical lens and the alignment slot are located above the sensor chip. The alignment glass sheet is assembled to the alignment slot along an assembling direction. The alignment glass sheet has an asymmetric shape, and the alignment glass sheet and the alignment slot have only one assembling orientation therebetween along the assembling direction. The alignment glass sheet has an alignment chamfer engaged in a corner of the alignment slot that corresponds in shape to the alignment chamfer.

19 Claims, 11 Drawing Sheets

(51) Int. Cl.
*H04N 23/51* (2023.01)
*H04N 23/57* (2023.01)

(56) References Cited

U.S. PATENT DOCUMENTS

| | | | | |
|---|---|---|---|---|
| 2004/0104387 | A1* | 6/2004 | Mogamiya | H10F 39/804 |
| | | | | 257/40 |
| 2007/0183773 | A1* | 8/2007 | Aoki | G03B 17/02 |
| | | | | 396/529 |
| 2021/0234999 | A1* | 7/2021 | Mai | H04N 23/55 |
| 2022/0413250 | A1* | 12/2022 | Zhou | G02B 7/026 |

\* cited by examiner

CAMERA MODULE, MANUFACTURING METHOD THEREOF, AND MANUFACTURING METHOD OF GLASS THEREFOR

CROSS-REFERENCE TO RELATED PATENT APPLICATION

This application claims the benefit of priority to Taiwan Patent Application No. 113100847, filed on Jan. 9, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a camera, and more particularly to a camera module, a manufacturing method thereof, and a manufacturing method of a glass thereof.

BACKGROUND OF THE DISCLOSURE

In a conventional camera module, a glass thereof has a symmetrical shape, so that the glass can be assembled to have different assembling orientations. However, when the glass of the conventional camera module is provided with a light filtering function, the light filtering function has a directionality for filtering light so as to have only one correct assembling orientation, such that there is a risk of misplacement for the glass during assembly.

SUMMARY OF THE DISCLOSURE

In response to the above-referenced technical inadequacies, the present disclosure provides a camera module, a manufacturing method thereof, and a manufacturing method of a glass therefor for effectively improving on the issues associated with conventional camera modules.

In order to solve the above-mentioned problems, one of the technical aspects adopted by the present disclosure is to provide a manufacturing method of a camera module, which includes a glass preparation step and an assembling step. The glass preparation step includes a preparing process, a removing process, and a slicing process. The preparing process is implemented by providing a filter glass board that is defined into a plurality of groups each having four unit regions that are in a matrix arrangement and that intersect at a target point. The removing process is implemented by removing a predetermined segment of each of the groups to enable each of the four unit regions to have an asymmetric shape. In each of the groups, the predetermined segment encompasses the target point and is arranged on the four unit regions, and the four unit regions each having the asymmetric shape are arranged in 4-fold rotational symmetry with respect to the target point. The slicing process is implemented by slicing the filter glass board to separate the unit regions of the filter glass board from each other. Each of the unit regions having the asymmetric shape is defined as one of a plurality of alignment glass sheets that has an alignment chamfer corresponding in position to the predetermined segment. The assembling step is implemented by placing one of the alignment glass sheets into an alignment slot of a camera lens along an assembling direction. The alignment chamfer of the one of the alignment glass sheets is engaged in a corner of the alignment slot that corresponds in shape to the alignment chamfer, and the alignment slot and any one of the alignment glass sheets have only one assembling orientation therebetween along the assembling direction.

In order to solve the above-mentioned problems, another one of the technical aspects adopted by the present disclosure is to provide a camera module, which includes a camera lens and an alignment glass sheet. The camera lens includes a carrying frame having an alignment slot, a sensor chip corresponding in position to the carrying frame, and at least one optical lens that is assembled to the carrying frame. The at least one optical lens and the alignment slot are arranged above the sensor chip. The alignment glass sheet is assembled in the alignment slot of the carrying frame along an assembling direction. The alignment glass sheet has an asymmetric shape, and the alignment glass sheet and the alignment slot have only one assembling orientation therebetween along the assembling direction. The alignment glass sheet has an alignment chamfer engaged in a corner of the alignment slot that corresponds in shape to the alignment chamfer.

In order to solve the above-mentioned problems, yet another one of the technical aspects adopted by the present disclosure is to provide a manufacturing method of a glass for a camera module, which includes a preparing process, a removing process, and a slicing process. The preparing process is implemented by providing a filter glass board that is defined into a plurality of groups each having four unit regions that are in a matrix arrangement and that intersect at a target point. The removing process is implemented by removing a predetermined segment of each of the groups to enable each of the four unit regions to have an asymmetric shape. In each of the groups, the predetermined segment encompasses the target point and is arranged on the four unit regions, and the four unit regions each having the asymmetric shape are arranged in 4-fold rotational symmetry with respect to the target point. The slicing process is implemented by slicing the filter glass board to separate the unit regions of the filter glass board from each other. Each of the unit regions having the asymmetric shape is defined as one of a plurality of alignment glass sheets that has an alignment chamfer corresponding in position to the predetermined segment.

Therefore, the camera module, the manufacturing method thereof, and the manufacturing method of a glass thereof in the present disclosure can be provided to ensure that the alignment glass sheet can be assembled in the camera lens at a correct orientation for filtering light through the structural cooperation between the alignment glass sheet and the alignment slot, thereby effectively preventing the alignment glass sheet from being misplaced in the camera lens.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 1:
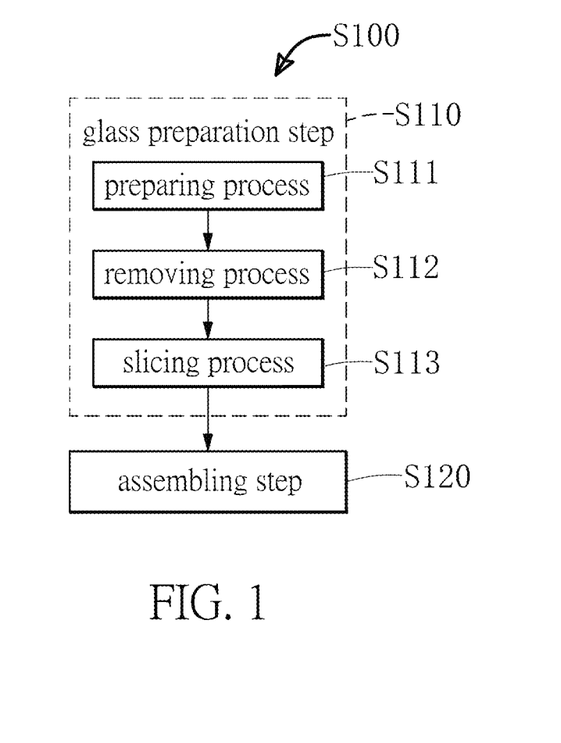
FIG. 1 is a flowchart of a manufacturing method of a camera module according to an embodiment of the present disclosure.

Referring to FIG. 1 to FIG. 11, an embodiment of the present disclosure is provided. As shown in FIG. 1, the present embodiment provides a manufacturing method of a camera module S100, which sequentially includes (or implements) a glass preparation step S110 and an assembling step S120 for producing a camera module 100. The glass preparation step S110 can be referred to as a manufacturing method of a glass for a camera module.

It should be noted that while the glass preparation step S110 is described as being performed in cooperation with the assembling step S120 in the present embodiment, the present disclosure is not limited thereto. For example, in other embodiments of the present disclosure not shown in the drawings, the glass preparation step S110 (or the manufacturing method of the glass for the camera module) can be individually implemented or can be implemented in cooperation with other steps.

The glass preparation step S110 sequentially includes (or implements) a preparing process S110, a removing process S120, and a slicing process S130. The following description sequentially describes the processes S111-S113 of the glass preparation step S110, but the present disclosure is not limited thereto. For example, in other embodiments of the present disclosure not shown in the drawings, the processes S111-S113 of the glass preparation step S110 can be adjusted or changed according to design requirements.

Figure 2:
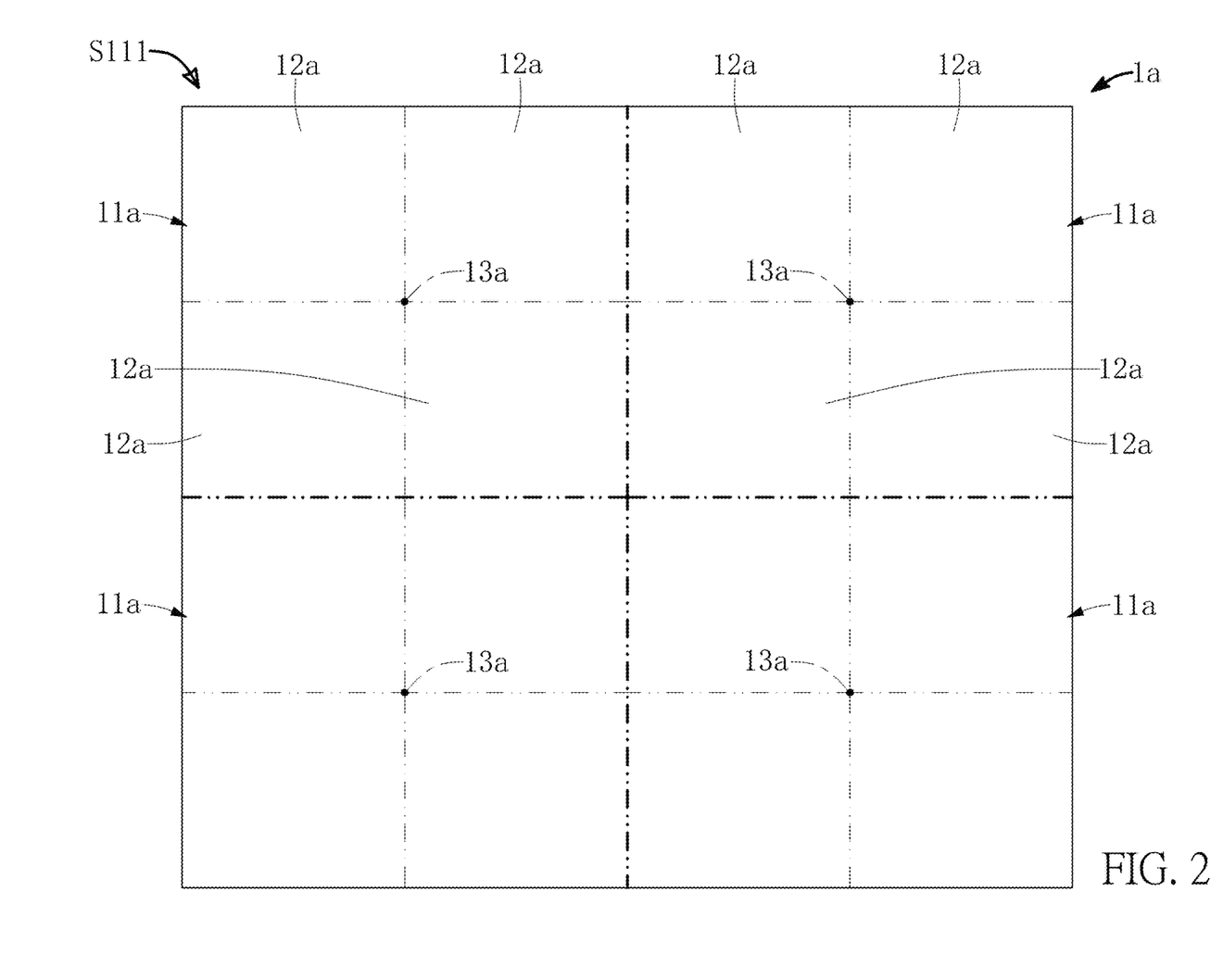
FIG. 2 is a schematic view showing a preparing process of the manufacturing method of FIG. 1.

As shown in FIG. 1 and FIG. 2, the preparing process S110 is implemented by providing a filter glass board 1a that is defined into a plurality of groups 11a each having four unit regions 12a that are in a matrix arrangement. The filter glass board 1a in the present embodiment has a square shape or a rectangular shape, and the unit regions 12a have a same shape being a rectangular shape, but the present disclosure is not limited thereto. For example, in other embodiments of the present disclosure not shown in the drawings, the filter glass board 1a can have a circular shape.

Specifically, the groups 11a of the filter glass board 1a in the present embodiment are connected to each other, the unit regions 12a of the groups 11a are in a matrix arrangement, and the four unit regions 12a of each of the groups 11a intersect at a target point 13a, but the present disclosure is not limited thereto. For example, in other embodiments of the present disclosure not shown in the drawings, any two of the groups 11a of the filter glass board 1a can be spaced apart from each other by a gap therebetween; or, the unit regions 12a of the groups 11a can be staggered with each other.

Figure 3:
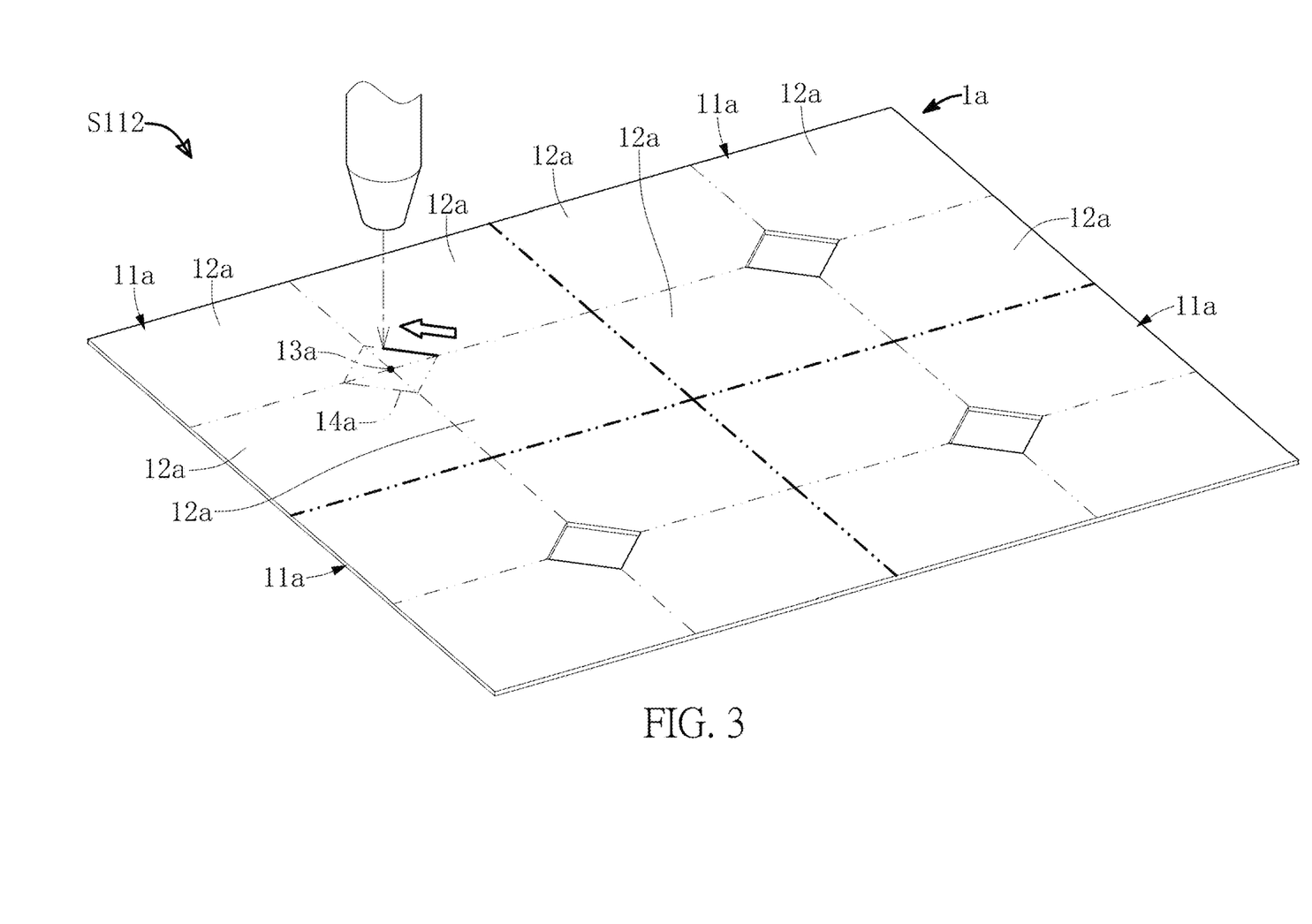
FIG. 3 is a schematic view showing a removing process of the manufacturing method of FIG. 1.

As shown in FIG. 1 and FIG. 3, the removing process S112 is implemented by removing a predetermined segment 14a of each of the groups 11a to enable each of the four unit regions 12a to have an asymmetric shape. Specifically, in each of the groups 11a, the predetermined segment 14a covers (i.e., has or encompasses) the target point 13a and is arranged on the four unit regions 12a. In the present embodiment, the predetermined segment 14a of each of the groups 11a is removed in at least one of a plasma etching manner, a deep reactive ion etching (DRIE) manner, a chemical wet etching manner, a flow waterjet cutting manner, a sandblasting cutting manner, and a laser cutting manner, but the present disclosure is not limited thereto.

Moreover, in each of the groups 11a, the four unit regions 12a each having the asymmetric shape are arranged in 4-fold rotational symmetry with respect to the target point 13a. Accordingly, the shape of the predetermined segment 14a has a corresponding limitation. In other words, the shape of the predetermined segment 14a is preferably arranged in 4-fold rotational symmetry with respect to the target point 13a. For example, the predetermined segment 14a has a circle shape, an oval shape, a prism shape, or a square shape. In the present embodiment, the predetermined segments 14a respectively removed from the groups 11a have a same shape, but the present disclosure is not limited thereto. For example, in other embodiments of the present disclosure not shown in the drawings, the predetermined segments 14a can have at least two different shapes according to design requirements.

Specifically, a corner of each of the unit regions 12a is arranged on the predetermined region 14a and is removed, and an area of the corner (i.e., an area of the removed part of the unit region 12a after the removing process is implemented) is within a range from 0.1% to 49% of an area of the rectangular shape (i.e., an area of the unit region 12a before the removing process is implemented).

Figure 4:
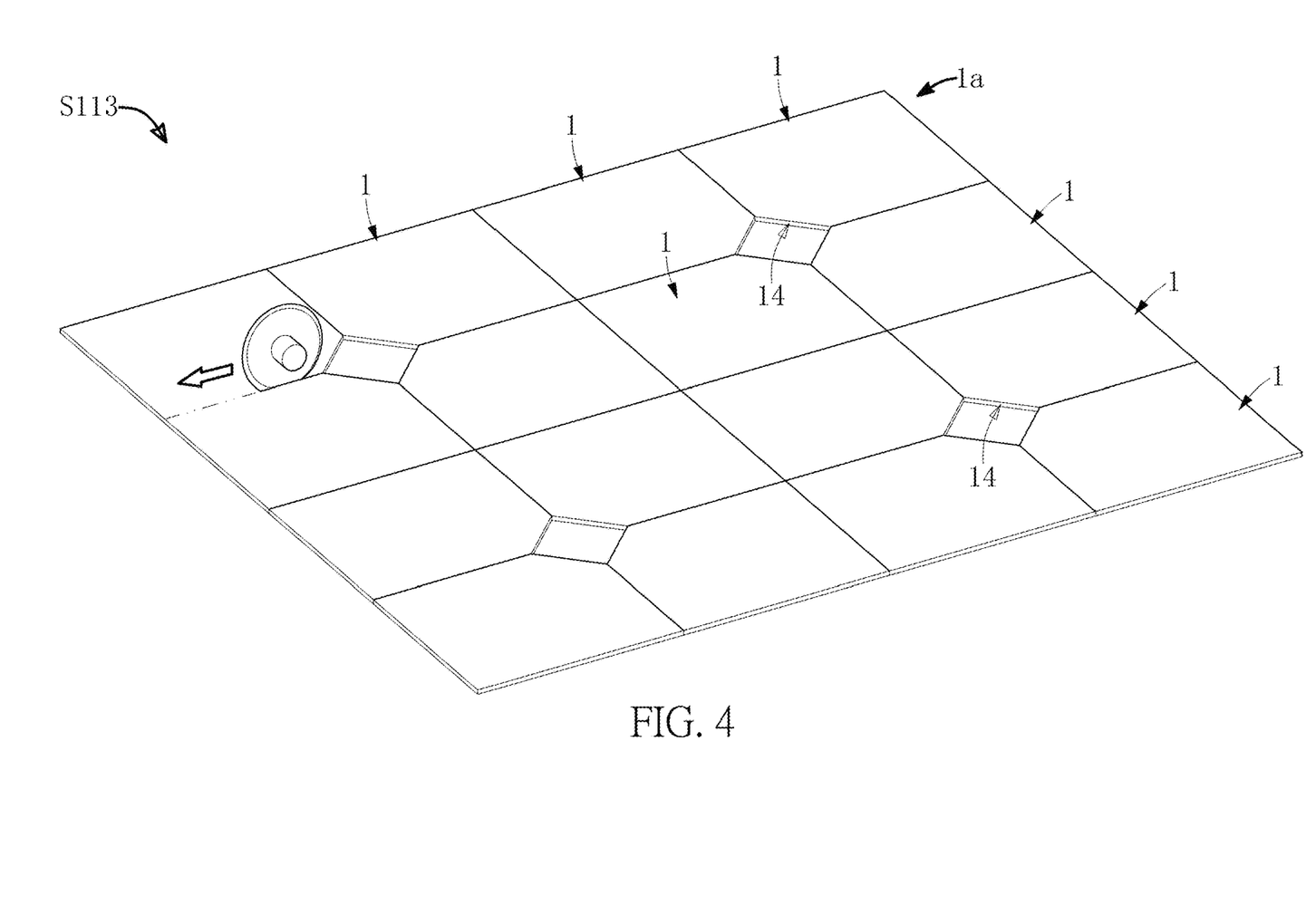
FIG. 4 is a schematic view showing a slicing process of the manufacturing method of FIG. 1.
Figure 5:
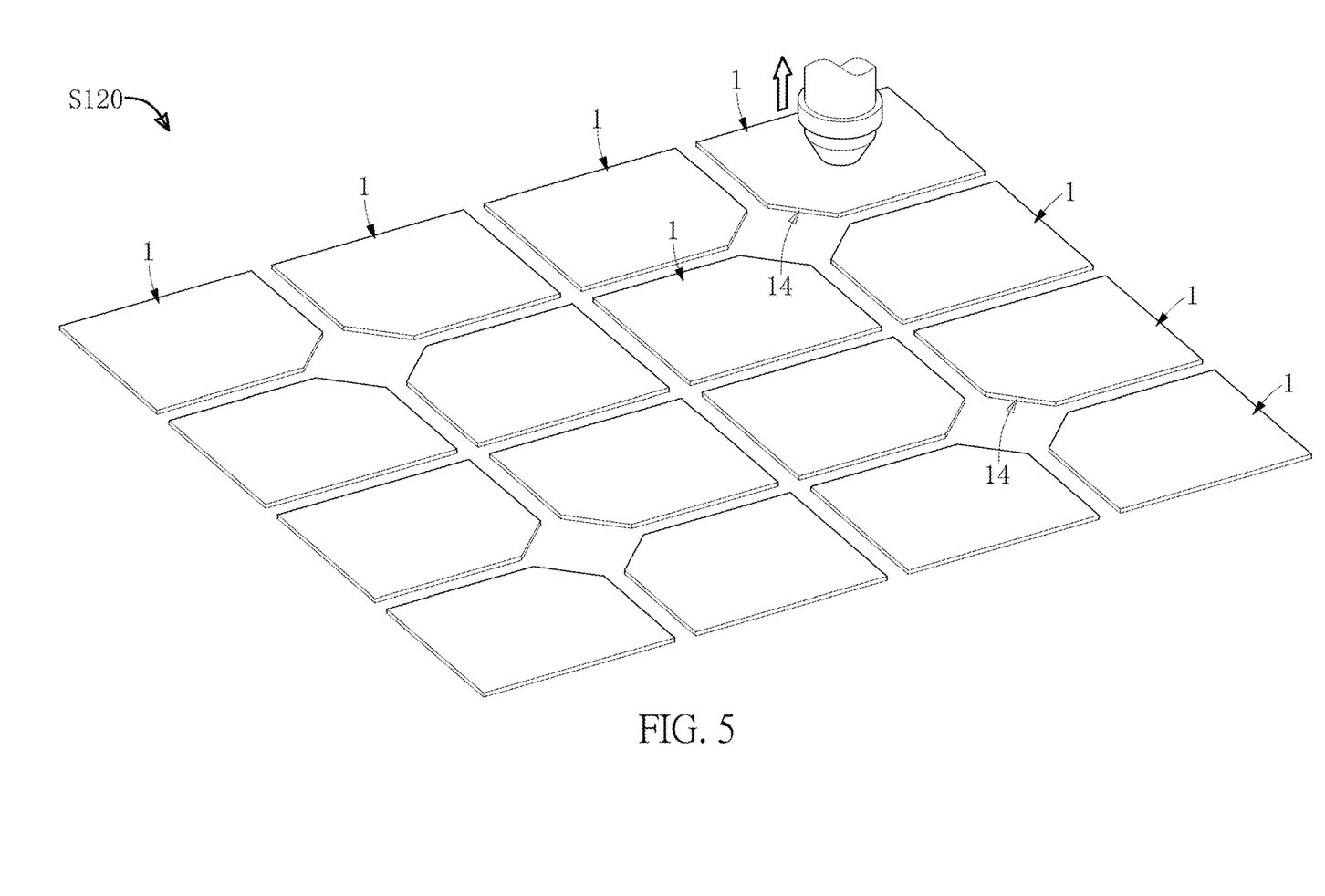
FIG. 5 and FIG. 6 are schematic views showing an assembling step of FIG. 1.

As shown in FIG. 1, FIG. 3, and FIG. 4, the slicing process S113 is implemented by slicing the filter glass board 1a to separate the unit regions 12a of the filter glass board 1a from each other. Specifically, each of the unit regions 12a having the asymmetric shape is defined as one of a plurality of alignment glass sheets 1. In other words, each of the alignment glass sheets 1 has the asymmetric shape. Each of the alignment glass sheets 1 is a filter glass and has an alignment chamfer 14 corresponding in position to the predetermined segment 14a.

Accordingly, the alignment glass sheet 1 in the present embodiment has a single assembling orientation through the asymmetric shape thereof, and the single assembling orientation is in cooperation with a light filtering direction of the alignment glass sheet 1, so that the assembling orientation of the alignment glass sheet 1 is unique. In other words, any glass sheet not for filtering light is different from the alignment glass sheet 1 (or the filter glass board 1a) provided by the glass preparation step S110 of the present disclosure. Moreover, the above description substantially describes the glass preparation step S110, and the following description describes the assembling step S120 that is implemented by using the alignment glass sheets 1 manufactured by the glass preparation step S110.

As shown in FIG. 1 and FIG. 5 to FIG. 8, the assembling step S120 is implemented by placing one of the alignment glass sheets 1 into an alignment slot 231 of a camera lens 2 along an assembling direction D. Specifically, the alignment chamfer 14 of the one of the alignment glass sheets 1 is engaged in a corner 232 of the alignment slot 231 that corresponds in shape to the alignment chamfer 14. The alignment slot 231 and any one of the alignment glass sheets 1 have only one assembling orientation therebetween along the assembling direction D. Furthermore, the alignment glass sheet 1 in the present embodiment is captured by using a vacuum nozzle, but the present disclosure is not limited thereto.

Accordingly, the manufacturing method of the camera module S100 in the present embodiment is implemented to ensure that the alignment glass sheet 1 can be assembled in the camera lens 2 at a correct orientation for filtering light through the structural cooperation between the alignment glass sheet 1 and the alignment slot 231, thereby effectively preventing the alignment glass sheet 1 from being misplaced in the camera lens 2.

Figure 7:
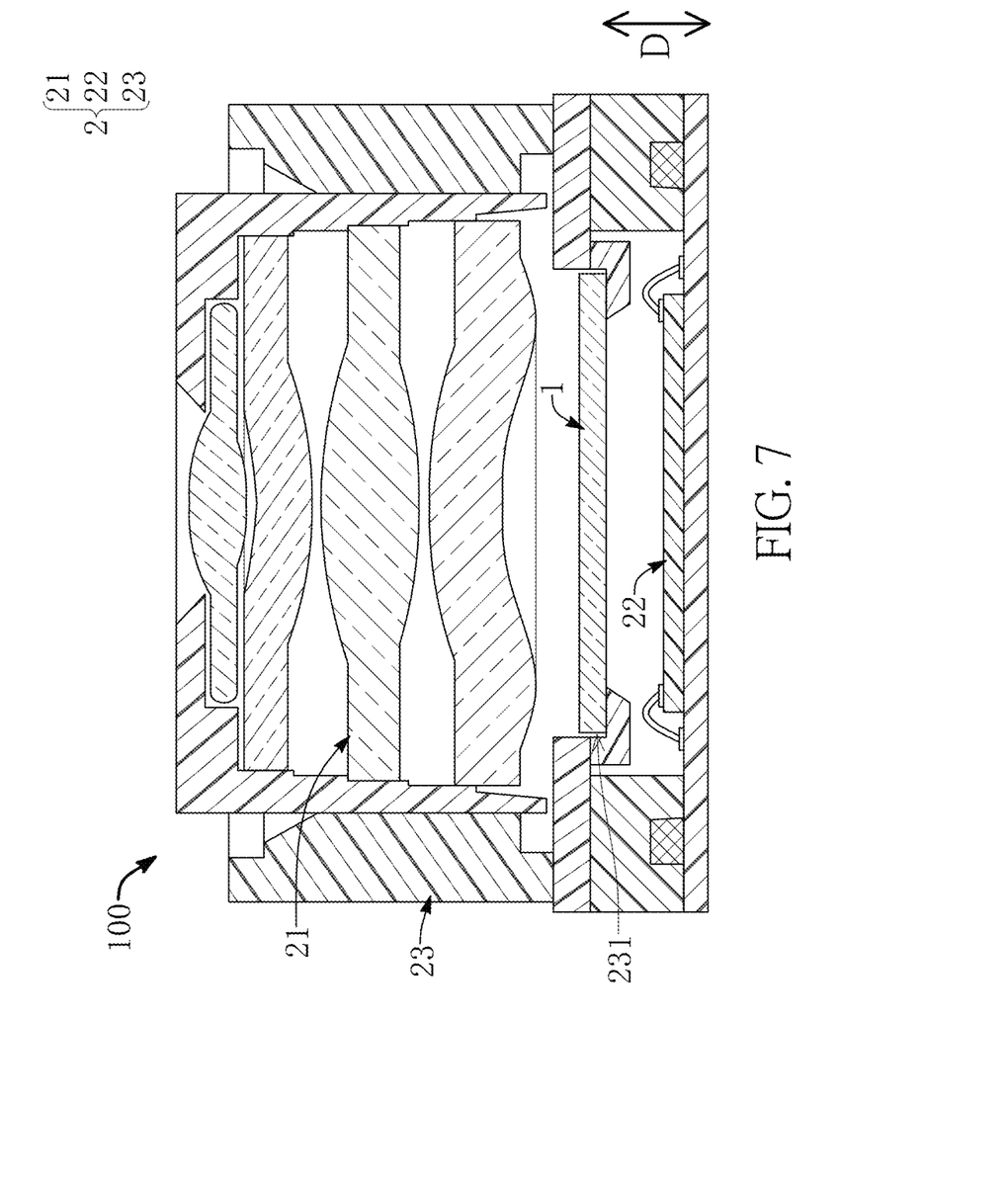
FIG. 7 is a schematic cross-sectional view of the camera module according to the embodiment of the present disclosure.
Figure 8:
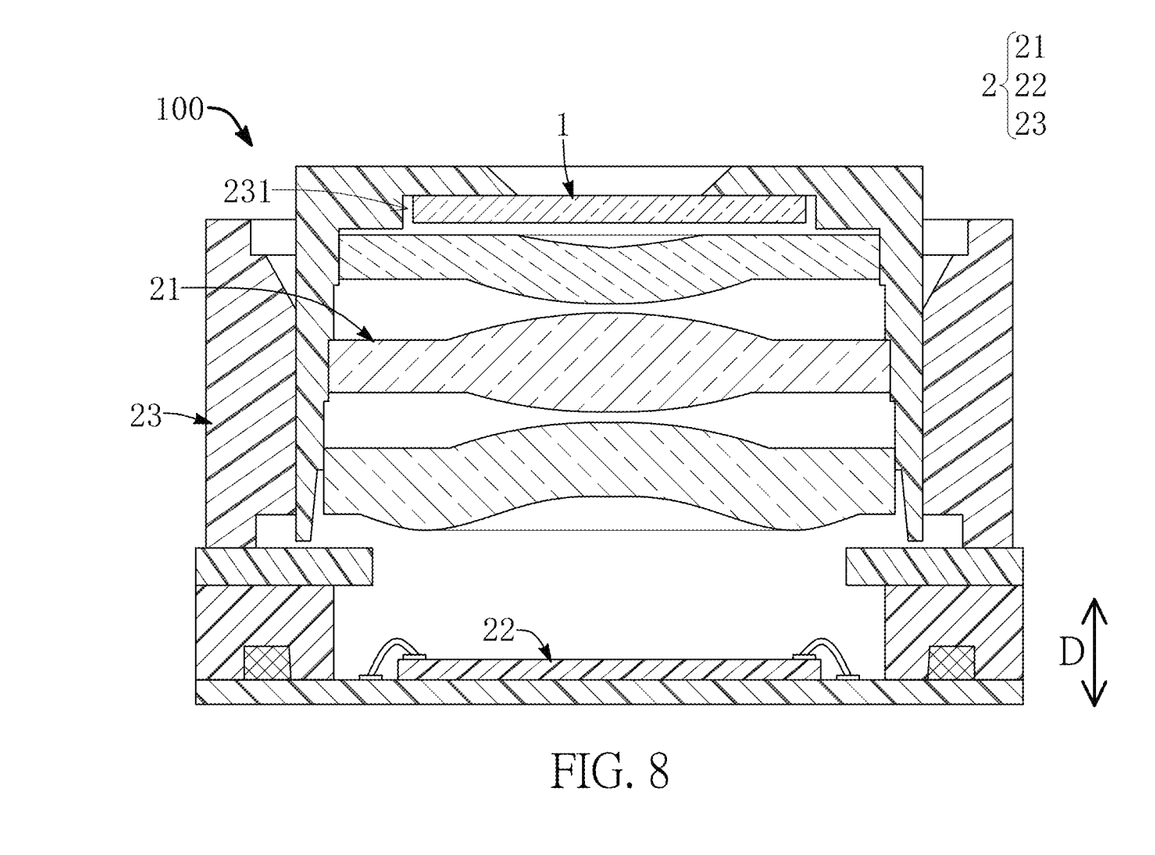
FIG. 8 is a schematic cross-sectional view of the camera module in another configuration according to the embodiment of the present disclosure.

It should be noted that the camera lens 2 includes a sensor chip 21 and at least one optical lens 22 that is spaced apart from the sensor chip 21 along the assembling direction D. The specific structure of the camera lens 2 can be adjusted or changed according to design requirements, and the following description describes the camera lens 2 provided in two possible structures, but the present disclosure is not limited thereto. As shown in FIG. 7, the alignment glass sheet 1 is located between the sensor chip 21 and the at least one optical lens 22 along the assembling direction D. Or, as shown in FIG. 8, the at least one optical lens 22 is located between the sensor chip 21 and the alignment glass sheet 1 along the assembling direction D.

The manufacturing method of the camera module S100 in the present embodiment is described in the above description, and the following description describes the structural features of the camera module 100 produced by implementing the manufacturing method of the camera module S100. Accordingly, at least part of the structural features of the camera module 100 can be referred to in the above description for the manufacturing method of the camera module S100, but the present disclosure is not limited thereto.

As shown in FIG. 6 to FIG. 9, the camera module 100 includes a camera lens 2 and an alignment glass sheet 1 that is assembled to the camera lens 2 along an assembling direction D. The camera lens 2 includes a carrying frame 23, a sensor chip 21 disposed on the carrying frame 23, and at least one optical lens 22 that is assembled to the carrying frame 23. Moreover, the carrying frame 23 in the present embodiment is formed by combining a plurality of parts. The carrying frame 23 has an alignment slot 231, and the at least one optical lens 22 and the alignment slot 231 are arranged above the sensor chip 21.

Figure 6:
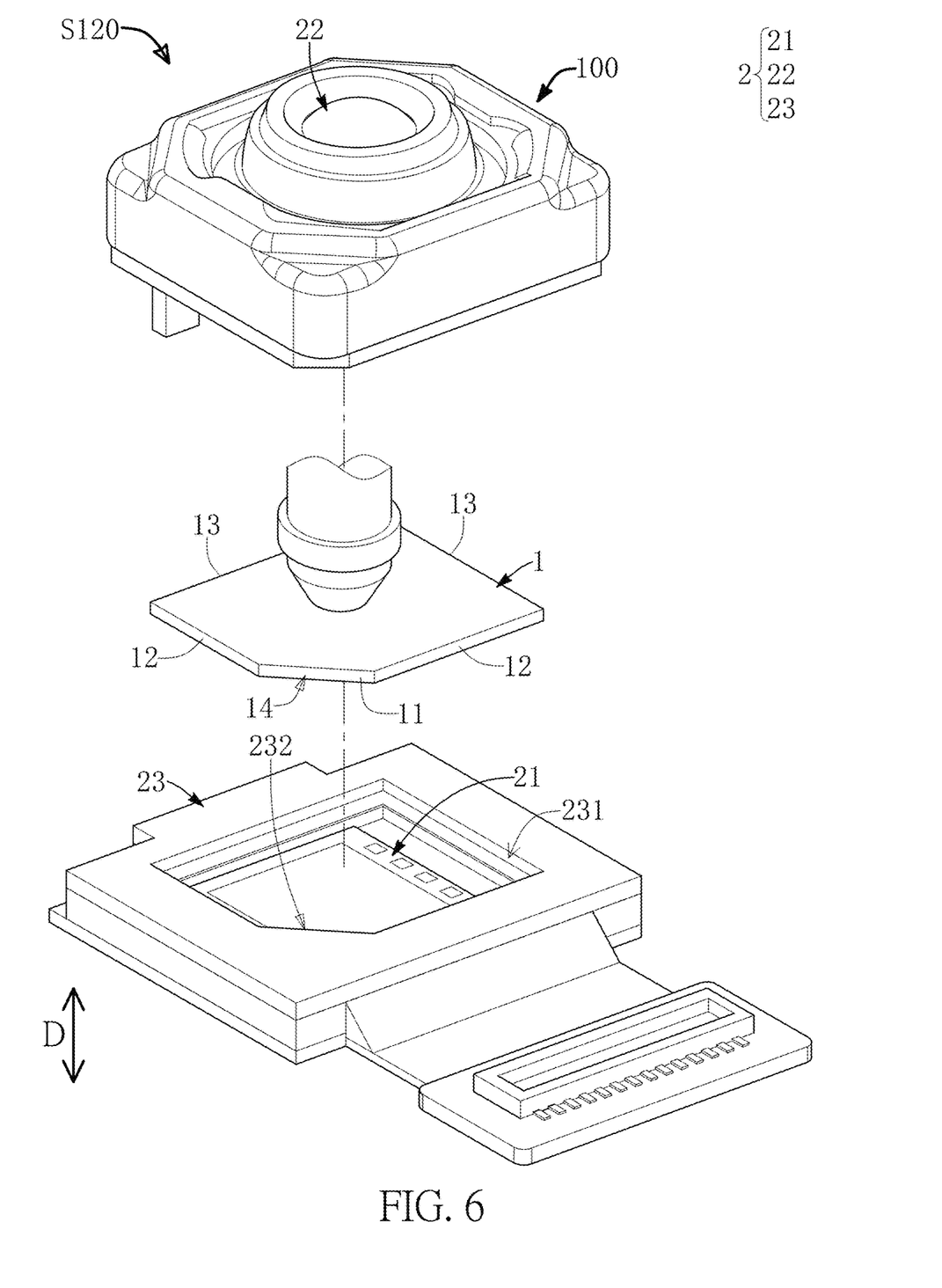

Specifically, the carrying frame 23 can be adjusted to change the position of the alignment slot 231 according to design requirements. For example, as shown in FIG. 6, the alignment slot 231 is located between the sensor chip 23 and the at least one optical lens 22 along the assembling direction D, but the present disclosure is not limited thereto. In other words, as shown in FIG. 8, the at least one optical lens 22 is located between the sensor chip 21 and the alignment slot 231 along the assembling direction D.

As shown in FIG. 6 to FIG. 9, the alignment glass sheet 1 in the present embodiment is a filter glass and has an asymmetric shape. The asymmetric shape is substantially a pentagon shape, and the asymmetric shape has a first edge 11, two second edges 12 respectively connected to two ends of the first edge 11, and two third edges 13 that are perpendicularly connected to the two second edges 12, respectively, but the present disclosure is not limited thereto. The two second edges 12 respectively define two extending lines virtually extending therefrom and intersecting with each other. The two second edges 12, the two extending lines, and the two third edges 13 jointly define a rectangular shape, the two extending lines and the first edge 11 jointly define a truncation space R, and an area of the truncation space R is within a range from 0.1% to 49% of an area of the rectangular shape.

Figure 9:
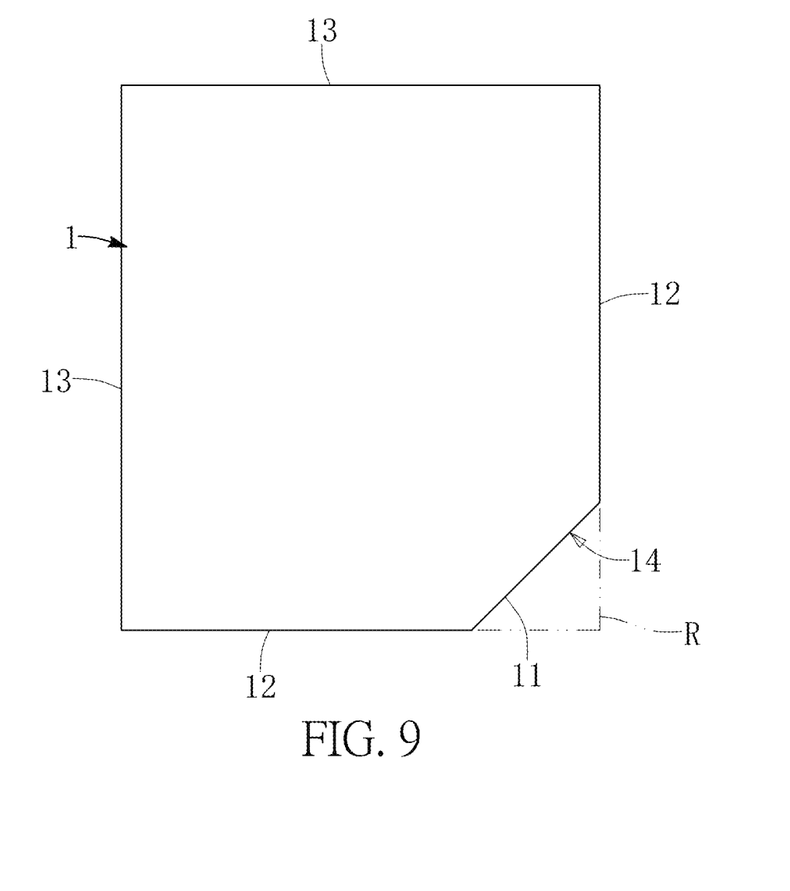
FIG. 9 is a schematic view showing an alignment glass sheet in a first configuration according to the embodiment of the present disclosure.
Figure 10:
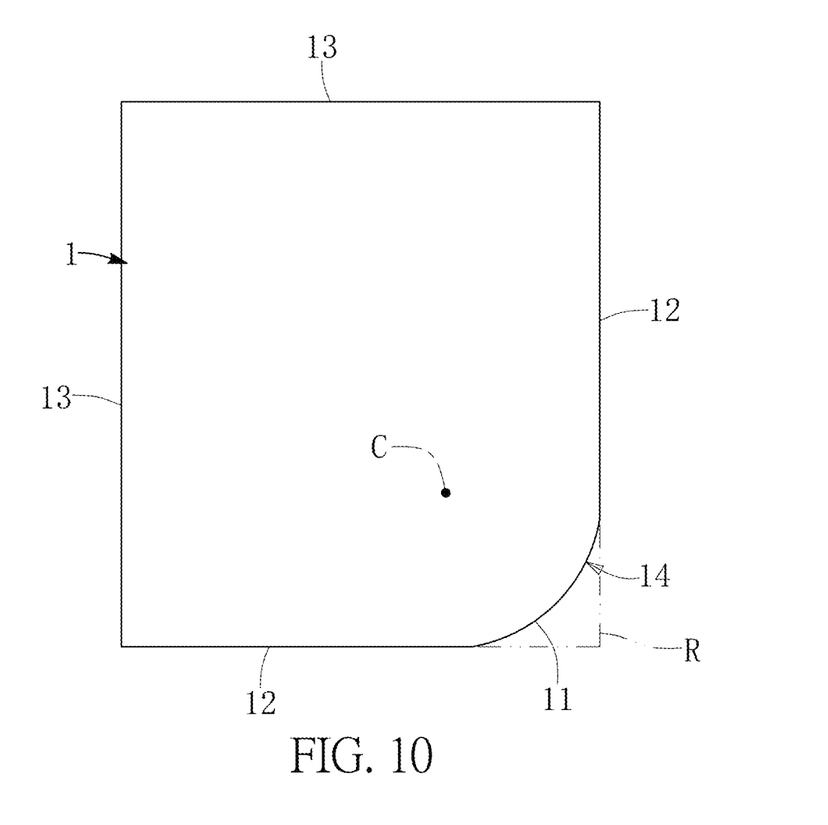
FIG. 10 is a schematic view showing the alignment glass sheet in a second configuration according to the embodiment of the present disclosure.
Figure 11:
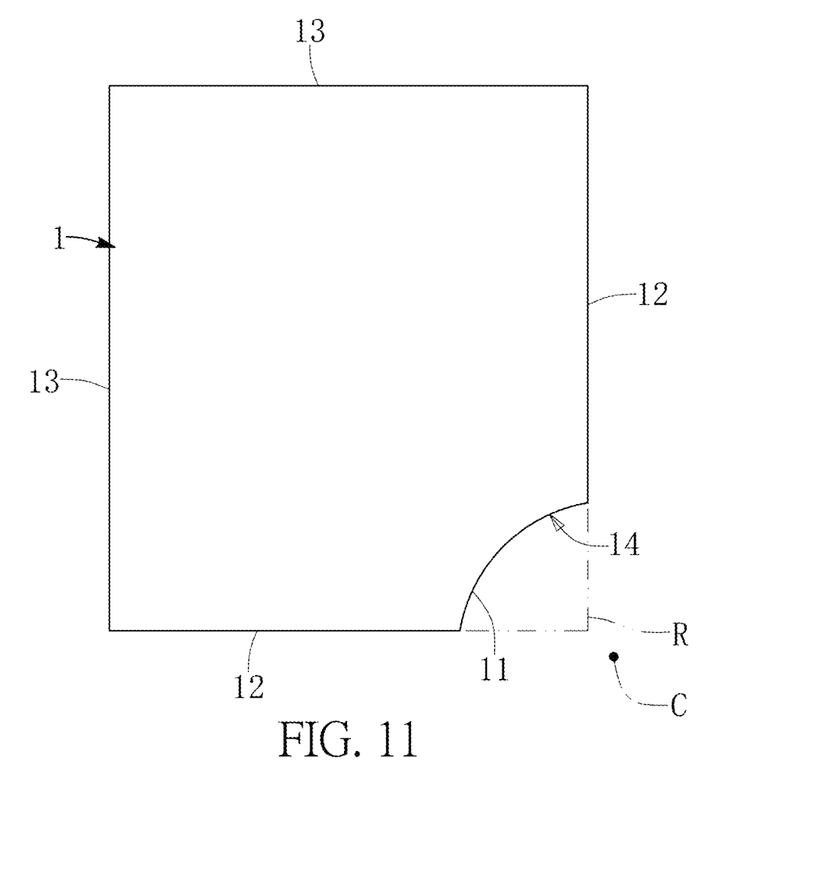
FIG. 11 is a schematic view showing the alignment glass sheet in a third configuration according to the embodiment of the present disclosure.

In the present embodiment, the first edge 11 of the asymmetric shape can be adjusted or changed according to design requirements, and the present disclosure is not limited thereto. For example, as shown in FIG. 9, the first edge 11 is a straight line, and the first edge 11 and any one of the second edges 12 have an obtuse angle therebetween. Or, as shown in FIG. 10, the first edge 11 is a convex curved line having a center of curvature C that is located on the alignment glass sheet 1. Or, as shown in FIG. 11, the first edge 11 is a concave curved line having a center of curvature C that is located outside of the truncation space R defined by the two extending lines and the first edge 11.

Furthermore, the alignment glass sheet 1 is assembled in the alignment slot 231 of the carrying frame 23 along the assembling direction D. As shown in FIG. 6, the alignment glass sheet 1 has an alignment chamfer 14 having the first edge 11, and the alignment chamfer 14 of the alignment glass sheet 1 is engaged in a corner 232 of the alignment slot 231 that corresponds in shape to the alignment chamfer 14, so that the alignment glass sheet 1 and the alignment slot 231 have only one assembling orientation therebetween along the assembling direction D, thereby effectively preventing the alignment glass sheet 1 from being misplaced in the camera lens 2.

Beneficial Effects of the Embodiment

In conclusion, the camera module, the manufacturing method thereof, and the manufacturing method of a glass thereof in the present disclosure can be provided to ensure that the alignment glass sheet can be assembled in the camera lens at a correct orientation for filtering light through the structural cooperation between the alignment glass sheet and the alignment slot, thereby effectively preventing the alignment glass sheet from being misplaced in the camera lens.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A manufacturing method of a camera module, comprising:
    a glass preparation step including:
        a preparing process implemented by providing a filter glass board that is defined into a plurality of groups each having four unit regions that are in a matrix arrangement and that intersect at a target point;
        a removing process implemented by removing a predetermined segment of each of the groups to enable each of the four unit regions to have an asymmetric shape, wherein, in each of the groups, the predetermined segment encompasses the target point and is arranged on the four unit regions, and the four unit regions each having the asymmetric shape are arranged in 4-fold rotational symmetry with respect to the target point; and
        a slicing process implemented by slicing the filter glass board to separate the unit regions of the filter glass board from each other, wherein each of the unit regions having the asymmetric shape is defined as one of a plurality of alignment glass sheets that has an alignment chamfer corresponding in position to the predetermined segment; and
    an assembling step implemented by placing one of the alignment glass sheets into an alignment slot of a camera lens along an assembling direction, wherein the alignment chamfer of the one of the alignment glass sheets is engaged in a corner of the alignment slot, the corner corresponding in shape to the alignment chamfer, and the alignment slot and any one of the alignment glass sheets have only one assembling orientation therebetween along the assembling direction.

2. The manufacturing method of the camera module according to claim 1, wherein, in the preparing process, the unit regions have a same shape being a rectangular shape, and wherein, in the removing process, a corner of each of the unit regions is arranged on the predetermined region and is removed, and an area of the corner of each of the unit regions is within a range from 0.1% to 49% of an area of the rectangular shape.

3. The manufacturing method of the camera module according to claim 1, wherein, in the preparing process, the groups are connected to each other, and the unit regions of the groups are in a matrix arrangement.

4. The manufacturing method of the camera module according to claim 1, wherein, in the removing process, the predetermined segment of each of the groups is removed in at least one of a plasma etching manner, a deep reactive ion etching (DRIE) manner, a chemical wet etching manner, a flow waterjet cutting manner, a sandblasting cutting manner, and a laser cutting manner.

5. The manufacturing method of the camera module according to claim 1, wherein, in the removing process, the predetermined segment has a circle shape, an oval shape, a prism shape, or a square shape.

6. The manufacturing method of the camera module according to claim 1, wherein the camera lens includes a sensor chip and at least one optical lens that is spaced apart from the sensor chip along the assembling direction, and the alignment glass sheet is located between the sensor chip and the at least one optical lens along the assembling direction.

7. The manufacturing method of the camera module according to claim 1, wherein the camera lens includes a sensor chip and at least one optical lens that is spaced apart from the sensor chip along the assembling direction, and the at least one optical lens is located between the sensor chip and the alignment glass sheet along the assembling direction.

8. A camera module, comprising:
    a camera lens including:
        a carrying frame having an alignment slot;
        a sensor chip corresponding in position to the carrying frame; and
        at least one optical lens assembled to the carrying frame, wherein the at least one optical lens and the alignment slot are arranged above the sensor chip; and
    an alignment glass sheet assembled in the alignment slot of the carrying frame along an assembling direction, wherein the alignment glass sheet has an asymmetric shape, and the alignment glass sheet and the alignment slot have only one assembling orientation therebetween along the assembling direction, and wherein the alignment glass sheet has an alignment chamfer engaged in a corner of the alignment slot, the corner corresponding in shape to the alignment chamfer.

9. The camera module according to claim 8, wherein the asymmetric shape is a pentagon shape having a first edge arranged on the alignment chamfer, two second edges respectively connected to two ends of the first edge, and two third edges that are perpendicularly connected to the two second edges, respectively.

10. The camera module according to claim 9, wherein the first edge is a straight line, and the first edge and any one of the two second edges have an obtuse angle therebetween.

11. The camera module according to claim 9, wherein the first edge is a convex curved line having a center of curvature that is located on the alignment glass sheet.

12. The camera module according to claim 9, wherein the two second edges respectively define two extending lines virtually extending therefrom and intersecting with each other, the two extending lines and the first edge jointly define a truncation space, and the first edge is a concave curved line having a center of curvature that is located outside of the truncation space.

13. The camera module according to claim 9, wherein the two second edges respectively define two extending lines virtually extending therefrom and intersecting with each other, and wherein the two second edges, the two extending lines, and the two third edges jointly define a rectangular shape, the two extending lines and the first edge jointly define a truncation space, and an area of the truncation space is within a range from 0.1% to 49% of an area of the rectangular shape.

14. The camera module according to claim 8, wherein the alignment glass sheet is a filter glass.

15. A manufacturing method of a glass for a camera module, comprising:
  a preparing process implemented by providing a filter glass board that is defined into a plurality of groups each having four unit regions that are in a matrix arrangement and that intersect at a target point;
  a removing process implemented by removing a predetermined segment of each of the groups to enable each of the four unit regions to have an asymmetric shape, wherein, in each of the groups, the predetermined segment encompasses the target point and is arranged on the four unit regions, and the four unit regions each having the asymmetric shape are arranged in 4-fold rotational symmetry with respect to the target point; and
  a slicing process implemented by slicing the filter glass board to separate the unit regions of the filter glass board from each other, wherein each of the unit regions having the asymmetric shape is defined as one of a plurality of alignment glass sheets that has an alignment chamfer corresponding in position to the predetermined segment.

16. The manufacturing method of the glass for the camera module according to claim 15, wherein, in the preparing process, the unit regions have a same shape being a rectangular shape, and wherein, in the removing process, a corner of each of the unit regions is arranged on the predetermined region and is removed, and an area of the corner is within a range from 0.1% to 49% of an area of the rectangular shape.

17. The manufacturing method of the glass for the camera module according to claim 15, wherein, in the preparing process, the groups are connected to each other, and the unit regions of the groups are in a matrix arrangement.

18. The manufacturing method of the glass for the camera module according to claim 15, wherein, in the removing process, the predetermined segment of each of the groups is removed in at least one of a plasma etching manner, a deep reactive ion etching (DRIE) manner, a chemical wet etching manner, a flow waterjet cutting manner, a sandblasting cutting manner, and a laser cutting manner.

19. The manufacturing method of the glass for the camera module according to claim 15, wherein, in the removing process, the predetermined segment has a circle shape, an oval shape, a prism shape, or a square shape.

* * * * *